July 24, 1956
T. W. KALBOW
2,755,709
FIXTURE FOR HOLDING A TUBULAR ARTICLE IN A MILLING MACHINE
Filed June 26, 1953
2 Sheets-Sheet 1
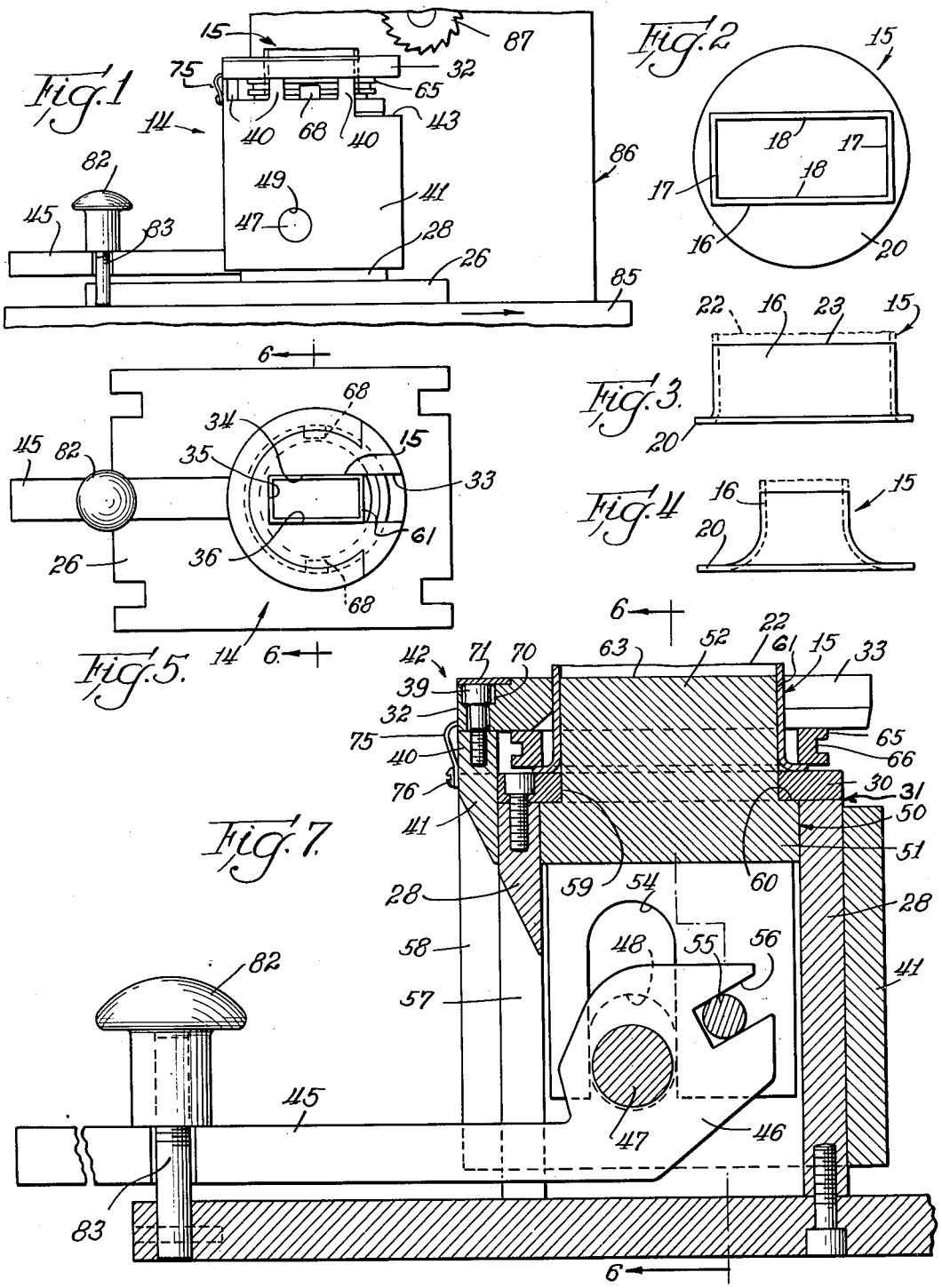
INVENTOR:
T. W. KALBOW
BY:- C. B. Hamilton
ATTY

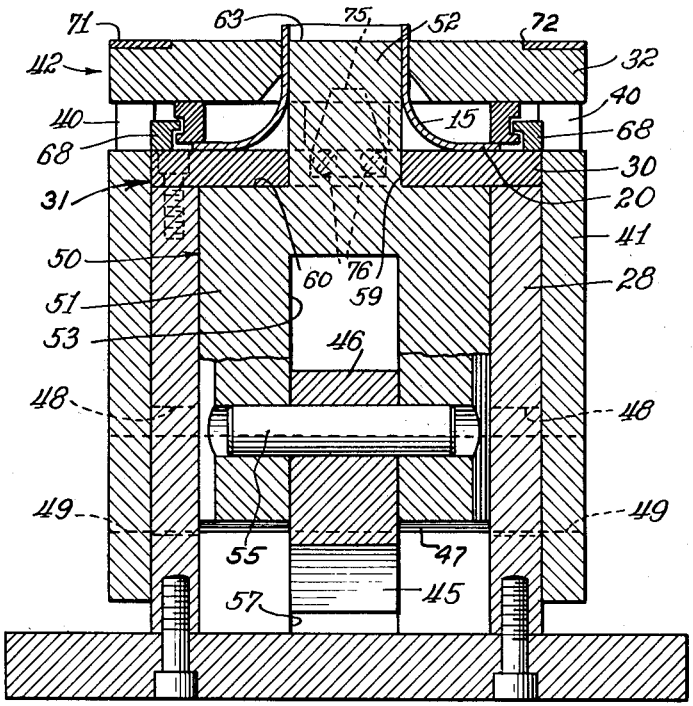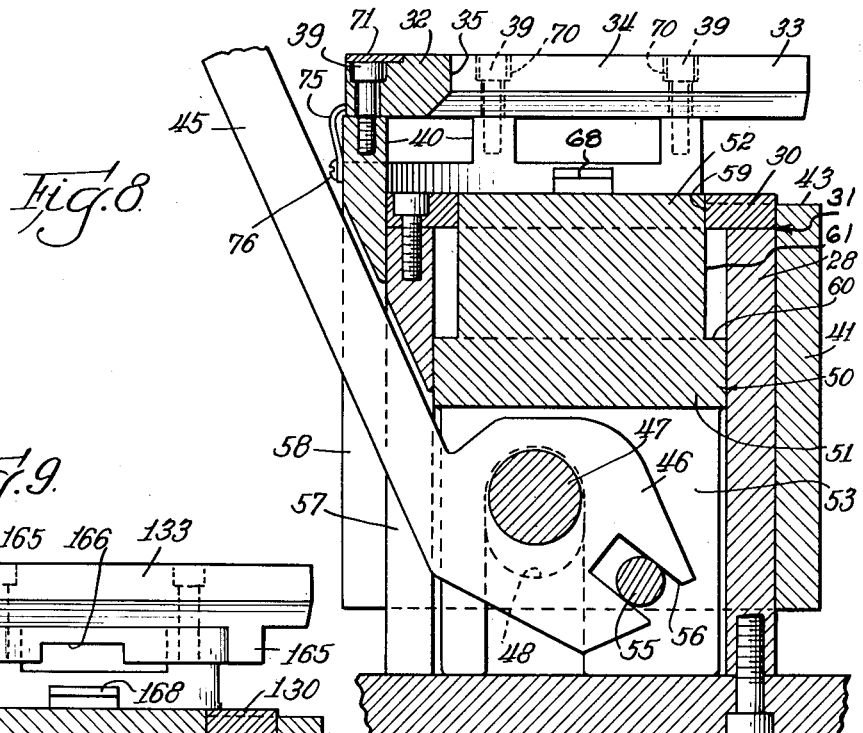

United States Patent Office 2,755,709
Patented July 24, 1956

2,755,709

FIXTURE FOR HOLDING A TUBULAR ARTICLE IN A MILLING MACHINE

Theodore W. Kalbow, Chicago, Ill., assignor to Western Electric Company, Incorporated, New York, N. Y., a corporation of New York Application June 26, 1953, Serial No. 364,408

8 Claims. (Cl. 90—60)

This invention relates to a milling fixture and more particularly to a fixture for holding a tubular article in a milling machine and supporting the walls thereof while the article is being trimmed to a predetermined size.

It is an object of the present invention to provide a fixture for holding a tubular article and supporting the walls thereof to maintain the precise dimensional configurations thereof while a portion of the article is being trimmed therefrom.

In accordance with one embodiment of the invention of a fixture for holding a tubular article in a milling machine and supporting the walls thereof while a portion of the article is being cut away, there is provided a base having a stationary clamping member for supporting the tubular member thereon at a predetermined elevation, and a movable clamping member having a recess for receiving the tubular article therein is vertically movable on the stationary clamping member to an operative position for clamping the article thereon. The recess in the movable clamping member forms surfaces for supporting portions of the exterior surfaces of the walls of the article below and adjacent the line on which the article is to be trimmed and a movable central plunger slidably mounted on the stationary clamping member has an end portion conforming to portions of the interior surfaces of the walls and is movable to an operative position to cooperate with the movable clamping members to support the walls of the tubular article below and adjacent the line of trim while the upper end portion of the article is milled off. A lever connected to the movable clamping member and the plunger is manually operable to move the clamping member and the plunger to and from an operative position for clamping the article and an inoperative position permitting the loading and unloading of the tubular articles.

Other objects and advantages of the present invention will become apparent by reference to the following detailed description and the accompanying drawings illustrating a preferred embodiment thereof, in which Fig. 1 is a fragmentary diagrammatic elevational view of a milling machine with the article supporting fixture thereon;

Figs. 2–4 are plan, front, and end views, respectively, of the tubular article supported in the fixture for cutting;

Fig. 5 is a plan view of the fixture;

Fig. 6 is a cross-sectional view taken on the lines 6—6 of Figs. 5 and 7;

Figs. 7 and 8 are longitudinal vertical sectional views of the fixture with parts thereof in different positions; and Fig. 9 is a fragmentary vertical sectional view of a portion of the fixture showing a modified construction of a portion thereof.

The present fixture 14 is designed to support a tubular article 15, such as a part of an internal wave guide which is drawn from a sheet of relatively soft metal and has a rectangular tubular portion 16, including a first pair of oppositely disposed end walls 17 and a second pair of oppositely disposed side walls 18, which walls, 17 and 18, at one end thereof, are directed outwardly to form a circular end flange 20 disposed perpendicularly to the tubular portion 16. The opposite end portion 22 of the tubular article 15 is to be trimmed by a milling cutter along a line 23 parallel to the flanged end of the article and in a predetermined spaced relation thereto.

The fixture 14 comprises a base plate 26 on which is secured a vertically disposed stationary sleeve 28. To the upper end of the sleeve 28 is secured a horizontally disposed plate 30 adapted to engage the flanged end of the article for supporting the article thereon. The sleeve 28 and the plate 30 form a stationary clamping element 31 against which the article is adapted to be clamped. A movable clamping member in the form of a circular plate 32 is adapted to cooperate with the stationary clamping plate 30 to clamp the article 15 therebetween. A slot 33 formed in the plate 32 and extending inwardly from one edge thereof for receiving the article 15 has a plurality of vertically disposed surfaces 34, 35, and 36 engageable with portions of the exterior surfaces of three walls of the tubular portion 16 of the article 15. The surfaces 34, 35, and 36 of the plate 32 are adapted to engage the walls of the article 15 immediately below the line 23 thereof and the portions of the plate 32 below the surfaces 34, 35, and 36 are beveled to provide clearance for the curved wall portions of the article 15.

The plate 32 is secured by shoulder screws 39 to a plurality of posts 40 extending upwardly from a movable outer sleeve 41 mounted on the stationary sleeve 28 for vertical movement thereon. Thus, the sleeve 41 and the plate 32 form a movable clamping element 42 which is adapted to be moved to and from a raised or inoperative position shown in Fig. 8 and a lower or operative position shown in Fig. 7. The sleeve 41 is cut away at 43 and the posts 40 are arranged to provide clearance for the insertion of the article 15 from the right when the movable clamping element is in its upper position as viewed in Fig. 8.

The movable clamping element 42 is adapted to be moved from one position to another by actuating means including a lever 45 having a head 46 formed on one end thereof. A pin 47 mounted in an aperture in the head 46 passes through an aperture in the head 46 and has its end portions extending through apertures 48 in the stationary sleeve 28 and journaled in bearing apertures 49 in the movable sleeve 41 to form a pivotal connection between the lever and the movable sleeve. The lever 45 also serves to actuate a plunger 50, comprising a cylindrical lower portion or block 51 slidably mounted for vertical movement within the stationary sleeve 28 and a rectangular upper end portion or block 52. The block 51 has a slot 53 for receiving the head 46 and a portion of the lever 45 therein and a transversely disposed slot 54 providing clearance for the pin 47. A pin 55 mounted in a transversely disposed bore in the block 51 fits into a slot 56 in the head 46 of the lever 45 and establishes a pivotal connection between the lever 45 and the plunger 50. Clearance slots 57 and 58 are provided in the sleeves 28 and 41, respectively, for the lever 45.

The centrally disposed rectangularly shaped end portion or block 52 of the plunger fits in an aperture 59 in the plate 30 and forms an insert which conforms in cross-section to a portion of the interior of the article 15 and has a pair of vertical end walls and a pair of side walls adapted to engage the inner surfaces of the walls 17 and 18 of an article 15 in the fixture 14. When the plunger 50 is in its upper or operative position (Fig. 7) with the upper end 60 of the block 51 in engagement with the plate 30, the upper surface 63 of the insert 58 is flush with the upper face of the plate 32 and cooperates with the plate 32 to support the walls 17 and 18 of the article 15 below and in close proximity to the trimming line 23 against lateral displacement during the milling operation for trimming off the upper portion 22 of the article.

A removable annular spacer or ring 65 is placed on the article 15 in engagement with the upper marginal surface of the flange 20 before the article is inserted in the fixture and the spacer ring 65 is adapted to engage the plate 32 and be forced downwardly thereby to hold the flange 20 of the article 15 against the stationary clamping plate 30 in response to actuation of the lever 45. The spacer ring 65 has an annular peripheral groove 66 into which the end portions of a pair of stationary stripper members 68 (Figs. 5 and 6) mounted on a stationary clamping plate 30 are adapted to fit when the ring 65 and the article 15 are inserted in the fixture (Figs. 5 and 6). The strippers 68 serve to strip the article from the movable clamping plate 32 as the plate 32 is moved to its upper position in the event that the article 15 is frictionally held by the plate.

The plate 32 may be secured to the post 40 in fixed relation thereto or it may be mounted for limited horizontal movement relative to the posts. As shown herein the countersunk apertures 70 in the plate 32 through which the shoulder screws 39 pass are sufficiently large to permit a limited lateral or horizontal floating movement of the plate 32 and an arcuate relatively thin plate or chip guard 71 is secured to the plate 32 in a groove 72 formed on the upper face thereof to prevent chips from getting into the slots. A leaf spring 75 is secured to the outer sleeve 41 by a pair of screws 76 and the upper end of the spring 75 engages the plate 32 and urges it to the right as viewed in Figs. 7 and 8 into engagement with an end wall 17 of the article 15.

In response to movement of the lever 45 from the position shown in Fig. 7 to the position shown in Fig. 8, the movable clamping element 42 is raised and the plunger 50 is lowered to their inoperative positions indicated in Fig. 8. With the parts of the fixture in open position as shown in Fig. 8 an article 15 with a spacer ring 65 positioned thereon may be inserted horizontally into the upper surface of the stationary clamping plate 30 with the upper portion of the rectangular tubular part 16 of the article directed through the slot 33 and into engagement with the wall 35 of the plate 30. The handle 45 may then be lowered, causing the movable clamping element to move downwardly and the plunger 50 to move upwardly to the operative position shown in Fig. 7 with the walls 17 and 18 of the article 15 supported against lateral displacement between the insert 52 and the plate 32. During the upward movement of the plunger 50 the insert 52 thereon moves into engagement with the inner walls of the article 15 and centralizes the article and the movable clamping plate 32 relative to the plunger. The lever 45 may be clamped in its lower position to lock the fixture in operative position by locking means including a nut 82 threaded on a rod 83 which is pivotally connected to the base 26. The rod 83 may be swung into vertical position into a slot in the lever 45 and the nut 82 may be rotated thereon to secure the lever in its lower position or to release the lever.

The fixture is adapted to be mounted on a table 85 of a milling machine 86 as shown in Fig. 1 and the fixture is adapted to clamp the article 15 with the upper end 22 disposed at an elevation so that when the table is moved into the cutter 87 the cutter will mill off the upper portion 22 of the article 15 along the line 23 while the walls 17 and 18 of the article 15 are supported between the insert 58 and the plate 32, except for one wall 17 which is supported only by the wall 61 of the insert, to prevent lateral displacement of the walls 17 and 18 during the cutting operation and thus maintain the precise dimensions of the article.

If desired, the clamping ring 65 may be formed integral with the plate 32 of the fixture. As shown in Fig. 9, a clamping plate 132 is provided with a downwardly projecting arcuate clamping rib 165 corresponding to portions of the removable spacer ring 65 for clamping the flange portion 20 of the article 15 against the stationary clamping plate 130 of the fixture. The clamping plate 132, which is similar to the plate 32, has a slot 133 which intersects the clamping rib 165 and is similar to the slot 33 in the plate 32. The rib 165 is interrupted at 166—166 to provide clearance for a pair of stripper fingers 168 which are fixed to the stationary clamping plate 130 and overlie diametrically opposed portions of the flange 20 of the article 15 for stripping the article 15 from the movable clamping plate 132. The other elements of the fixture are similar in construction and operation to those of the fixture disclosed in Figs. 5–8.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for holding a hollow article in a machine and for supporting the walls of the article while one end thereof is being cut away along a predetermined line by a cutter, comprising a base, holding means on said base for supporting the article in fixed relation to said base and with said predetermined line of the article in a plane in fixed relation to said base and in the line of cut of said cutter, an inner member having surfaces disposed transversely of said plane and engageable with inner surfaces of portions of the wall of said article below and adjacent said plane, an outer member having surfaces spaced from and opposed to said surfaces on said inner member and engageable with outer surfaces of portions of the walls of said article below and adjacent said plane, and means for holding said inner and said outer members in engagement with said inner and said outer surfaces, respectively, of said walls and in fixed relation to each other and the base to support the walls of said article below and adjacent said plane during the cutting away of the end portion of the article.

2. A milling fixture for holding a hollow article having upstanding walls and a laterally disposed flange on one end thereof and for supporting the walls of the article while the other end is being trimmed therefrom along a predetermined line, comprising a base, a stationary clamping element on said base engageable with the flanged portion of said article for supporting said article with said line in a horizontal plane in line with the cut of a milling cutter, a vertically movable clamping member having a slot therein extending from a lateral edge thereof for receiving the article for horizontal movement thereinto and providing vertical supporting surfaces engageable with outer portions of the walls of the article and having lower surfaces engageable with the flange of the article for clamping the article against said stationary clamping element, means for moving said movable clamping member vertically from an inoperative position in spaced relation to said stationary clamping element to an operative position for clamping said article against the stationary clamping element and with the vertical supporting surfaces of the movable clamping member disposed below and in close proximity to said plane, an insert having vertical supporting surfaces conforming to portions of the inner surfaces of the walls of said article and in spaced relation to the vertical supporting surfaces of said movable clamping member for receiving portions of the article therebetween, and means for moving said insert from an inoperative position in spaced relation to said article to an operative position within said article and with the supporting surfaces thereof in engagement with portions of the walls of the article below and in close proximity to said plane.

3. A milling fixture for holding a tubular article having upstanding walls and a laterally disposed flange on one end thereof and for supporting the walls of the article while the other end is being trimmed therefrom along a predetermined line by a cutter, comprising a base, a stationary clamping element on said base engageable with the flanged portion of said article for supporting said article with said predetermined line thereof in the plane of cut of said cutter, an insert having upstanding supporting surfaces conforming to portions of the inner surfaces of the walls of said article, means for supporting said insert in operative position within an article on said stationary clamping element and with the supporting surfaces of the insert in engagement with portions of the walls of the article below said plane and in close proximity thereto, a movable clamping member having a slot therein extending from one edge thereof for receiving the article therein and providing supporting surfaces engageable with portions of the outer surfaces of the walls of the article and having surfaces engageable with the flange of the article for clamping the article against said stationary clamping element, and means for moving said movable clamping member from an inoperative position in spaced relation to said stationary clamping element to an operative position for clamping said article against the stationary clamping element and with the supporting surfaces of the movable clamping element disposed below and in close proximity to said plane.

4. A milling fixture for holding a hollow article having parallel walls and a laterally disposed flange on one end thereof and for supporting the walls of the article while the other end is being trimmed therefrom along a predetermined line, comprising a base, a vertically disposed guide member fixed to said base having an apertured horizontally disposed plate on the top thereof forming a stationary clamping element engageable with the flange of the article for supporting the article thereon, a plunger guided for vertical movement on said guide member and having an upper portion extending through the apertured plate with vertical outer surfaces conforming to and engageable with inner portions of the walls of said article, a movable clamping plate having a slot therein extending from one edge thereof for receiving the article therein and providing vertical supporting surfaces engageable with outer portions of the walls of the article and having lower surfaces engageable with the flange of the article for clamping the article against said stationary clamping element, a slide member vertically movable on said fixed guide member, means for connecting the movable clamping plate on the upper end of said slide member against vertical movement and for limited lateral movement relative thereto, said slide member being shaped to provide clearance for lateral movement of the article into the slot in said movable clamping plate, spring means for stressing said movable clamping plate in one direction toward the open end of the slot, and means for actuating said movable clamping plate and said plunger to and from operative positions with the movable clamping plate clamping the article against the stationary clamping element and the vertical supporting surfaces of the movable clamping plate engaging outer portions of the walls of the article below and in close proximity to said predetermined line and with the vertical outer surfaces of the upper portion of the plunger within the article in engagement with the walls thereof below and in close proximity to said predetermined line.

5. A fixture for holding a hollow article having straight walls and a laterally disposed flange on one end thereof and supporting the walls of the article while the other end is being trimmed therefrom along a predetermined line, comprising a base, a vertically disposed tubular guide member fixed to said base and having an apertured horizontally disposed plate on the top thereof forming a stationary clamping element engageable with the flange of the article for supporting the article thereon with the walls extending upwardly, a plunger guided for vertical movement within said tubular guide member and having an upper portion extending through the apertured plate with outer surfaces conforming to and engageable with a portion of the inner surface of the walls of said article, a movable clamping plate having a slot therein extending from one edge thereof for receiving the article for lateral movement therein and providing vertical supporting surfaces engageable with portions of the outer surfaces of the walls of the article and having lower surfaces engageable with the flange of the article for clamping the article against said stationary clamping element, a movable tubular member vertically slidable on the outside of said fixed tubular guide member, means for connecting the movable clamping plate onto the upper end of said movable tubular member against vertical movement and for limited lateral movement relative thereto, said movable tubular member being shaped to provide clearance for lateral movement of the article into the slot in said movable clamping plate, spring means for stressing said movable clamping plate toward the open end of the slot, and a lever pivotally connected to said tubular slide member and said plunger for imparting movement thereto in opposite directions and operable in response to movement thereof for effecting the movement of said movable clamping plate and said plunger to and from operative positions with the movable clamping plate clamping the flange of the article against the stationary clamping element and with the vertical supporting walls of the movable clamping plate engaging the outer surfaces of portions of the walls of the article below and in close proximity to said predetermined line of trim and with the vertical outer surfaces of the upper portion of the plunger within the article in engagement with the walls thereof below and in close proximity to said predetermined line.

6. A milling fixture for holding a hollow article having straight walls and a laterally disposed flange on one end thereof and for supporting the walls of the article while a portion thereof is being trimmed therefrom along a predetermined line, comprising a base, an apertured stationary clamping element mounted on said base having a horizontal surface engageable with the flange of the article for supporting the article thereon with the walls extending upwardly, a plunger guided for vertical movement within the stationary clamping element and having an upper end portion with vertical outer surfaces conforming to and engageable with inner portions of the walls of said article, a movable clamping plate having a slot therein extending from one edge thereof for receiving the article therein and providing vertical supporting surfaces engageable with outer portions of the walls of the article and providing lower surfaces engageable with the flange of the article, a slide member guided for vertical movement on said stationary clamping element for supporting said movable clamping plate for vertical movement, a lever pivotally connected to said slide member and to said plunger for imparting movement thereto in opposite directions, said lever being movable to a first position to effect the movement of said movable clamping plate and said plunger to operative positions with the movable clamping plate clamping the article against the stationary clamping element and the vertical supporting walls of the movable clamping plate engaging outer portions of the walls of the article below and in close proximity to said predetermined line and with the vertical outer surfaces of the upper portion of the plunger within the article in engagement with inner portions of the walls thereof below and in close proximity to said predetermined line, and said lever being movable to a second position to raise the movable clamping plate and to lower the plunger to permit the removal of the article from the fixture.

7. A fixture for holding a hollow article having straight walls and a laterally disposed flange at one end thereof and for supporting the walls of the article while a portion thereof is being trimmed therefrom along a predetermined line, comprising a base, an apertured stationary clamping element mounted on said base and having a horizontal flat surface engageable with said flange for supporting said article with the walls thereof extending upwardly, a plunger member having vertical surfaces conforming to and engageable with the inner surfaces of said walls and guided for movement on said stationary clamping element to and from an operative position with the end portion of the plunger above said flat surface of the clamping element and in engagement with the inner walls of said article adjacent said line and an inoperative position with said end portion below said flat surface, a movable clamping member having a lateral slot therein for receiving the article and providing supporting surfaces engageable with portions of the outer surfaces of the walls of the article, guide means mounting said movable clamping member for vertical movement on said stationary clamping element to and from an operative position for clamping the flange portion of the article against the stationary clamping member and an inoperative position spaced above said flat surface and permitting the horizontal movement of the article on the stationary clamping member into the slot in said movable clamping member, and means for actuating said movable clamping member and said plunger to and from their operative and inoperative positions.

8. A fixture for holding a hollow article having straight walls and a laterally disposed flange at one end thereof and supporting the walls of the article while a portion of the walls is being trimmed therefrom along a predetermined line, comprising a base, an apertured stationary clamping element mounted on said base and having a horizontal flat surface engageable with said flange for supporting said article with the walls thereof extending upwardly, a plunger member having an end portion with vertical outer surfaces conforming to and engageable with the interior of said tubular member and guided for movement on said stationary clamping element to an operative position with said end portion of the plunger above said flat surface of the clamping element and with said vertical outer surfaces in engagement with the inner walls of said tubular article adjacent said line and to an inoperative position with said end portion below said flat surface, a movable clamping member having a slot therein for receiving the article for lateral movement thereinto and providing vertical supporting surfaces engageable with portions of the outer surfaces of the walls of the article, guide means mounting said movable clamping member for vertical movement on said stationary clamping element to an operative position for clamping the flange portion of the article against the stationary clamping member and to an inoperative position spaced above said flat surface and permitting the horizontal movement of the article on the stationary clamping member into the slot in said movable clamping member, means for actuating said movable clamping member and said plunger to and from their operative and inoperative positions, and stripper elements on said stationary clamping element engageable with the flange on said article for stripping the article from said movable clamping member.

References Cited in the file of this patent
UNITED STATES PATENTS
75,892    Fortenbach _____ Mar. 24, 1868